Feb. 28, 1961  R. D. RUMSEY  2,973,061
DIRECT ACTING DAMPER STRUCTURE
Filed Oct. 1, 1957
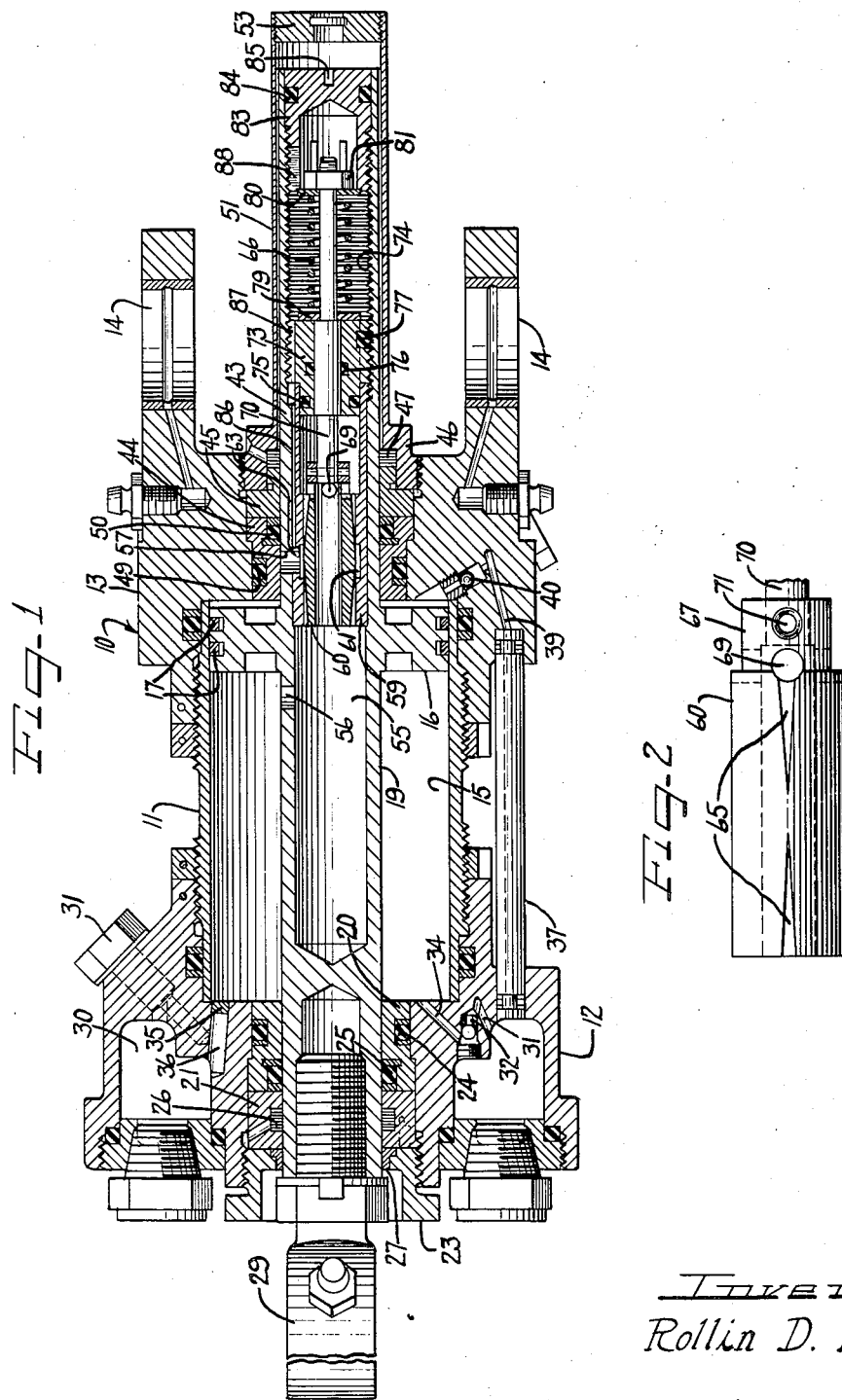
Inventor
Rollin D. Rumsey
by Hill, Sherman, Meroni, Gross & Simpson Attys

United States Patent Office 2,973,061
Patented Feb. 28, 1961

2,973,061

DIRECT ACTING DAMPER STRUCTURE

Rollin Douglas Rumsey, Buffalo, N.Y., assignor to Houdaille Industries, Inc., Buffalo, N.Y., a corporation of Michigan Filed Oct. 1, 1957, Ser. No. 687,451

4 Claims. (Cl. 188—96)

This invention relates to improvements in dampers and more particularly relates to direct acting dampers particularly adapted for aircraft and the like.

A principal object of the invention is to provide a novel and improved form of damper in which the damping strength is directly proportional to velocity.

A further object of the invention is to provide a novel and improved form of damper having a pressure operated orifice control valve therein so constructed and arranged as to enable the damping characteristic curve to readily be tailored to specific needs.

A still further and more detailed object of the invention is to provide an improved form of direct acting damper having a pressure operated orifice control valve varying the rate of flow from one working chamber to the other of the damper proportionately with pressure squared, and also acting as a relief valve upon excess pressure conditions.

Still another object of the invention is to provide a simplified form of a double acting pilot operated orifice control relief valve particularly adapted to vary the flow through the orifice of the damper with variations in pressure, in which a hollow valve spool having oppositely facing V-shaped notches on its face cooperating with a damping orifice, is moved along a damping orifice against a constant rate spring by the differential in pressure acting on the spool, to increase the flow area through the orifice proportionately with pressure squared.

These and other objects of the invention will appear from time to time as the following specification proceeds and with reference to the accompanying drawing wherein:

Figure 1 is a longitudinal sectional view taken through a damper constructed in accordance with the invention; and Figure 2 is a top plan view of the orifice control valve.

In the embodiment of the invention illustrated in the drawing, reference character 10 designates generally a direct acting damper of the linear type particularly adapted for use as a rotor blade lag damper, but which may effectively damp the flutter and vibration of the air foil parts of aircraft as well as various other vibrating parts.

The damper 10 comprises generally a tubular housing member 11 having a chambered end closure 12 threaded thereon and forming a reservoir for replenishing fluid, and closing one end of the damper, and having an end closure member 13 threaded on the opposite end thereof and closing the opposite end of the damper and having connectors 14 extending therefrom, and forming a means for connecting the damper to a stationary or movable part of the aircraft.

The interior wall of the housing 11 between the end closure members 12 and 13 forms damping chamber 15 having a piston 16 movable therealong and sealed thereto, as by piston rings 17, or any other suitable sealing means.

The piston 16 has a piston rod 19 extending from one end thereof through sealing glands 20 and 21 carried in the interior of the end closure member and reservoir 12 and retained in position therein as by a gland nut 23. The sealing gland 20 is shown as being sealed to the interior wall of the end closure member and reservoir 12 as by an O-ring sealing means 24, and as being sealed to the piston rod 19 as by an O-ring sealing means 25. The sealing gland 21 is shown as having a seal 26 carried therein engaging the piston rod 19. The gland nut 23 has a rod scraper 27 carried therein extending about the piston rod 19 and clamped into engagement with the outer face of the sealing gland 21. A connector 29 is shown as being mounted on the outer end of the piston rod 19 for connection to a stationary or movable part of an aircraft.

The end closure and reservoir member 12 is shown as having an annular reservoir 30 therein forming a replenishing chamber for the damper, which may be filled through a filler plug 31. The replenishing chamber or reservoir 30 has communication with the left hand end of the damping chamber 15 through a passageway 31, check valve chamber 32 and passageway 34, so arranged as to permit replenishing fluid to flow through the check valve into the damping chamber 15 on each stroke of the piston 16 toward the right, to replenish damping fluid leaking from the damping chamber 15. A scratched pin 35 in a hole 36 leading from the reservoir to the damping chamber is provided to form a small orifice, which may be approximately .006 inch in diameter, in order to permit minute quantities of air or oil to flow from the damping chamber 15 into the replenishing chamber 30 at each stroke of the piston 16 toward the left, and to thereby maintain the damper in a deaerated condition.

A tube 37 connects the replenishing chamber 30 with a passageway 39 in the end closure member 13 through a check valve 40. The check valve 40 permits fluid to enter the right-hand damping chamber to replenish fluid lost through the scratched dowel 35 as the piston 16 moves toward the left. The check valve 40 is suitably limited in movement toward the chamber 15 to accommodate damping fluid to pass into the damping chamber 15 and seats against the passageway 39 leading into the check valve chamber upon movement of the piston 16 to the right, to prevent the leakage of fluid from the right hand end of the damping chamber 15 back into the replenishing chamber 30.

Any air trapped in the right-hand chamber or coming out of solution in the damping fluid may leak past the piston rings 17 into the left-hand chamber and be bled into the replenishing chamber through the scratched dowel 35.

The piston 16 also has a piston rod extension portion 43 extending from the right-hand face thereof, through sealing glands 44 and 45, carried within the end closure member 13 and retained thereto as by an annular sealing nut 46 engaging a seal 47 with the end of the sealing gland 45 and the piston rod extension portion 43. External and internal O-ring seals 49 and 50 are carried in the sealing gland 44 for sealing the interior wall of the end closure member 13 and the piston rod extension portion 43 respectively.

The annular sealing nut 46 is shown as having a cylindrical wall 51 extending outwardly therefrom along the piston rod extension 43 for enclosing said piston rod extension. An end plug 53 is threaded within the end cylindrical wall 51 to close the end of the annular sealing nut 46 and to keep dirt from the piston rod extension.

The piston rod extension 43 is shown as being drilled from the outer end thereof for the entire length thereof through the piston 16 and a portion of the piston rod 19 and forming a chamber 55 for the passage of fluid from one side of the piston 16 to the other through an orifice 56 leading through the piston rod 19 and an orifice 57 leading through the piston rod extension 43. The chamber 55 is shown as having a sleeve 59 carried therein having a varying rate of flow orifice control and relief valve 60 mounted therein. The sleeve 59 has an internal annular passageway 61 having communication with the orifice 57 through an orifice 63 leading through said sleeve and registering with the orifice 57.

The valve 60 is shown in Figures 1 and 2 as being in the form of a sleeve or spool having V-shaped notches 65 cut in the face thereof and facing in opposite directions. The notches 65 have their apices facing each other adjacent but spaced outwardly from the transverse center of the valve sleeve. The notches 65 are shown in Figure 1 as gradually increasing in depth as they extend outwardly toward the opposite ends of the spool and as opening to the outer ends of said spool. In Figure 1, two sets of notches are shown as being provided in the spool. One set of notches is in registry with the orifice 57 and is centered with respect to said orifice by a fixed rate centering spring 66. The other set of notches is shown as being spaced 180° from the first set of notches, although it need not be so spaced and is exactly like the first set of notches and registers with the annular passageway 61 formed in the sleeve 59.

The flow area of fluid through the notches 65 thus increases as the valve 60 is moved against the centering spring 66 by the differential in pressure acting on the valve sleeve. The notches 65 provide a flow area increasing proportionately with the square of the pressure. This is attained because the valve moves linearly with pressure against a fixed rate spring 66 in either direction of its movement. Therefore, since the notches 65 are triangular in shape and the base and altitude are increased linearly with pressure the flow area of the respective notch is increased with pressure squared. This provides a damping strength curve directly proportional to velocity and increasing with the square of the pressure, and thereby enables the slope of the damping curve to be readily adjusted to provide the required damping effect for various damping conditions.

The valve sleeve 60 is shown as having a reduced diameter outer end portion 67 cross drilled, as indicated by reference character 69, to afford communication with the hollow interior of the valve sleeve and thereby accommodate the differential in pressure acting on the valve to move the valve along the sleeve 59 against the fixed rate spring 66, in opposite directions, depending upon the direction of operation of the damper. It will here be noted that the effective areas on which pressure acts to move the valve sleeve 60 against the fixed rate spring 66 are much smaller than the diameter of the valve spool, thereby in effect providing a pilot piston to operate the valve to vary the rate of flow between the orifice 56 and 57.

A rod 70 is shown as being secured to the reduced diameter end portion 67 as by a pin 71. The rod 70 extends outwardly from the valve sleeve 60 through a sealing member 73 mounted within the sleeve 59 and threaded within a spring chamber 74 in the piston rod extension 43. The sealing member 73 is shown as being sealed to the interior of the piston rod extension 43 as by an O-ring 75 and to the rod 70 as by an O-ring 76. A nylon locking plug 77 recessed within the sealing member 73 and having engagement with the threads of the threaded spring chamber 74 is provided to lock the sealing member 73 in position. The rod 70 is shown in Figure 1 as being shouldered adjacent the outer end of the sealing member 73 and as extending through a washer 79 abutting the shouldered portion of said rod and forming a seat for the centering spring 66. The rod 70 also extends through the centering spring 66 and through a washer 80 retained to said rod as by a nut 81 threaded on the outer end of said rod. The washer 80 is shown as abutting the inner end of a sealing nut 83 threaded within the end of the piston rod extension 43 and sealed thereto as by an O-ring 84. The sealing nut 83 is slotted at its outer end, as indicated by reference character 85, to afford a means for adjusting the load on the spring 66 and the pressure required to move the valve sleeve 60 along the sleeve 59, and to vary the rate of flow of damping fluid through the orifice 56 from one side of the piston 16 to the other.

The spring chamber 74 is connected with the orifice 57 by means of an axial groove 86 formed in the sleeve 59 and having communication with an aligned groove 87 formed in the sealing nut 73. The sealing nut 73, is provided with a slot 88 accommodating fluid under pressure to act on the outer end of the rod 70 and thereby provide equal effective pressure areas to move the valve sleeve 60 to the right or the left, depending upon the differential in pressure acting on the valve.

The effective pressure areas or pistons upon which the pressure acts when moving the valve in either direction is, therefore, much smaller in diameter than the valve spool 60, thereby permitting the use of a small spring of suitable capacity, and making it possible to place a spring of the required capacity within the diameter of the piston rod.

In Figure 1 of the drawing, the damping piston 16 is shown in substantially it full inward extremity. When in this position, the fit between the sealing member 44 and the piston rod extension 43 is sufficiently close that the orifice 57 will be closed and a snubbing action will have taken place, preventing the piston from striking the end of the damping chamber.

During normal operation of the damper, however, the damping piston is usually half way between the end extremities of the damping chamber 15 and oscillates sinusoidally from this mid-position.

During reciprocation or oscillation of the piston 16, as the piston moves toward the left, damping fluid will pass through the orifice 56, the V-shaped notches 65 in the valve sleeve 60 through the orifices 63 and 57 to the right-hand side of the damping piston 16. As the direction of movement of the piston 16 is reversed, the damping fluid will reverse its flow, flowing through the aligned orifices 57 and 63 and the notches 65 to the left-hand side of the damping piston through the orifice 56.

It may be seen from the foregoing that an improved form of damper and orifice control valve has been provided in which the orifice control valve is in the form of a pressure operated relief valve and metering piston, varying the flow area through the orifice at a rate increasing proportionately with pressure squared, and therefore providing a damping strength curve in which the damping strength is directly proportional to velocity, rather than to velocity squared, as in the usual orifice valve.

It may further be seen that the orifice control valve 60 not only serves as an orifice control valve to provide a damping strength increasing directly proportional to velocity, but that as the valve spool reaches the annular passageway 61 that the damping orifice is abruptly increased and that the valve thereby serves as a relief valve upon excess pressure conditions during either direction of operation of the damping piston.

It will be understood from the foregoing that while I have herein shown and described only one form in which my invention may be embodied, that various modifications and variations in the invention may be effected without departing from the spirit and scope of the novel concepts thereof.

I claim as my invention:

1. A direct acting linear damper comprising a housing having an inner cylindrical wall defining a damping chamber, a piston within said damping chamber having a piston rod extensible from one end of said housing, orifice means connecting one side of said piston with the other, a variable rate of flow double acting pilot operated orifice control relief valve having communication with said orifice means and accommodating the flow of damping fluid therebetween, a single constant rate spring seated within said piston rod and having operative connection with said valve to normally center said valve in each direction of movement of said piston, the differential in pressure acting on said valve against said spring varying the rate of flow between said orifice means at a rate increasing proportionately with pressure squared in each direction of movement of said piston relative to said damping chamber, said valve comprising a hollow valve spool having a cylindrical outer surface having V-shaped notches in the face thereof diverging from a position adjacent the center of said spool and in communication with said orifice means in all positions of said valve and opening to opposite ends of said valve and providing flow areas through said orifice means increasing proportionately with pressure squared.

2. In a direct acting linear damper comprising a housing having an inner cylindrical wall defining a damping chamber, a piston within said damping chamber having a piston rod extensible from one end of said housing, orifice means connecting one side of said piston with the other, and a double acting pilot operated orifice control relief valve having communication with said orifice means and accommodating the flow of damping fluid therebetween and operable by the differential in pressure acting thereon to vary the rate of flow between said orifice means at a rate increasing proportionately with pressure squared in each direction of movement of said piston relative to said damping chamber, and comprising a valve spool having a cylindrical outer surface having V-shaped notches in the face thereof diverging from a position adjacent the center of said spool and opening to opposite ends of said valve spool and providing flow areas in direct communication with said orifice means and increasing toward the outer ends of said valve spool, a single reverse acting constant rate spring seated at its opposite ends within said piston and having operative connection with said valve spool to normally maintain said valve spool in centered relation with respect to said orifice means, and the effective areas upon which pressure acts to operate said valve spool being less than the areas of the ends of said valve spool.

3. A direct acting linear damper comprising a housing having an inner cylindrical wall defining a damping chamber, a piston within said damping chamber having a piston rod extending from opposite ends thereof and extensible through opposite ends of said housing and sealed thereto, a connector at one end of said piston rod, said piston rod being hollow for a portion of its length and opening to the end thereof opposite said connector, two orifices, one communicating with each side of said piston and each leading to the hollow interior of said piston rod, a sleeve within said piston rod having communication with one of said orifices, double acting pilot operated orifice control relief valve within said sleeve and movable therealong by the differential in pressure of damping fluid acting thereon, means closing the open end of said piston rod, said orifice control valve comprising a valve spool having aligned generally V-shaped notches formed in the face thereof with the apices of said notches adjacent but spaced from the transverse center of said valve spool in centered relation with respect to one of said orifices and opening to opposite ends of said valve spool and providing flow areas through said orifice increasing proportionately with pressure squared in each direction of movement of said piston relative to said damping chamber to provide a damping effect increasing linearly with velocity.

4. A direct acting linear damper comprising a housing having an inner cylindrical wall defining a damping chamber, a piston within said damping chamber having a piston rod extending from opposite ends thereof and extensible through opposite ends of said housing and sealed thereto, a connector on one end of said piston rod, said piston rod being hollow for a portion of its length and opening to the end thereof opposite said connector, two orifices, one communicating with each side of said piston and each leading to the hollow interior of said piston rod, a sleeve within said piston rod having communication with said orifices, a double acting pilot operated orifice control relief valve within said sleeve comprising a valve spool movable along said sleeve by the differential in pressure of damping fluid acting on said valve spool, means closing the open end of said piston rod, and a constant rate spring within said piston rod centering said valve with respect to said orifices, said orifice control valve having aligned generally V-shaped notches formed in the face thereof, with the apices of said notches adjacent but spaced from the transverse center of said valve spool and normally in communication with one of said orifices and opening to opposite ends of said valve spool providing flow areas increasing proportionately with pressure squared to provide a damping effect increasing linearly with velocity.

References Cited in the file of this patent

UNITED STATES PATENTS

| | | |
|---|---|---|
| 635,848 | Dutton | Oct. 31, 1899 |
| 794,312 | Replogle | July 11, 1905 |
| 860,913 | Haeberlein | July 23, 1907 |
| 2,365,247 | Carlton | Dec. 19, 1944 |
| 2,698,675 | Rossman | Jan. 4, 1955 |
| 2,807,336 | Sweeney | Sept. 24, 1957 |
| 2,865,396 | Focht | Dec. 23, 1958 |

FOREIGN PATENTS

| | | |
|---|---|---|
| 1,081,938 | France | June 16, 1954 |